United States Patent [19]
Auborn

[11] 3,966,490
[45] June 29, 1976

[54] ELECTROCHEMICAL CELL
[75] Inventor: James J. Auborn, Groton, Mass.
[73] Assignee: GTE Laboratories Incorporated, Waltham, Mass.
[22] Filed: Aug. 15, 1975
[21] Appl. No.: 605,130

[52] U.S. Cl. .............................. 136/6 LN; 136/20; 136/100 R; 136/121; 136/167; 136/166
[51] Int. Cl.² .................. H01M 1/02; H01M 35/00; H01M 43/06
[58] Field of Search ................ 136/6 LN, 20, 83 R, 136/100 R, 137, 166, 167, 131, 121; 206/2

[56] References Cited
UNITED STATES PATENTS
3,922,174  11/1975  Heller .............................. 136/6 LN Primary Examiner—Anthony Skapars
Attorney, Agent, or Firm—Irving M. Kriegsman

[57] ABSTRACT

An electrochemical cell having an alkali metal anode, an electronically conducting cathode and a nonaqueous electrolytic solution containing an inorganic oxyhalide solvent is housed in a container the inner surface of which is an oxide of either aluminum, magnesium, titanium or alloys thereof.

17 Claims, No Drawings

ELECTROCHEMICAL CELL

BACKGROUND OF THE INVENTION

This invention relates to electrochemical cells. Most particularly, it relates to electrochemical cells having an alkali metal anode, an electronically conducting cathode and a nonaqueous electrolytic solution having an inorganic oxyhalide solvent.

Modern technology has placed increased emphasis on producing an electrochemical power source having improved reliability, light weight, high power and long life. Power sources meeting these requirements find ready civilian and military applications in communications, entertainment products, portable light sources and weapon systems.

Various high-voltage, high-energy density electrochemical cells have been the subject of recent investigation. Much of the work in this area has been involved with electrochemical cells having negative electrodes comprising highly reactive metals such as lithium.

Work on electrolytes or electrolytic solutions for lithium-based electrochemical power sources has progressed generally along two major lines: High temperature molten salt electrolytes and organic solvent based electrolytic solutions. A cell which utilizes a molten salt electrolyte provides a chemically stable system in which strong oxidants such as chlorine can be reduced at conductive cathodes such as carbon. A cell utilizing a lithium anode and a carbon cathode upon which chlorine is reduced provides exceptionally high energy and power density making development of a practical cell with these materials of particular interest. The molten salt lithium/chlorine cell (having a lithium anode, carbon cathode and a molten salt, typically lithium chloride, electrolyte) has many characteristics desirable in a high performance electrochemical cell. The anode is highly electropositive, and the compound being reduced is highly electronegative. The equivalent weight of the reaction product is low and the anode, cathode and electrolyte conductivities are high. Nevertheless, these cells have severe problems. The temperature range of operation, which for the lithium chloride electrolyte is 450°C to 650°C, necessitates heating systems and insulation that increase its cost, weight and complexity; auxiliary systems are needed to collect and store the chlorine evolved in rechargeable cells at these high temperatures; and there are few materials that can withstand for extended periods the attack of molten lithium, chlorine, and molten lithium chloride at these temperatures.

In parallel with the development of lithium cells with molten salt electrolytes, lithium cells with non-hydroxylic organic solvent-based electrolytic solutions have been developed. These cells have been called "organic electrolyte cells" although typically they employ electrolytic solutions consisting of inorganic solvents. Cells of this type have the advantage of being operable at room temperature; however, chlorine itself and other strong oxidants cannot be used as a cathode with these solvents since the solvents are oxidized. Therefore, cells of this type will not provide an energy density as high as a lithium/chlorine cell.

In application Ser. No. 342,233 filed Mar. 16, 1973, and assigned to the assignee of the present invention, and now abandoned, there is described an electrochemical cell having an anode selected from a specific group of materials, including lithium, a cathode selected from a wide range of materials, and an electrolyte including an inorganic solvent, specifically phosphorus oxychloride, and a solute, selected from a wide range of materials, dissolved in the solvent.

In application Ser. No. 305,811 filed Nov. 13, 1972, and assigned to the assignee of this application, there is described electrochemical cells wherein the phosphorus oxychloride solvent is admixed with a low freezing solvent material to extend the operating range of the phosphorus oxychloride cell to temperatures below about 0°C.

In application Ser. No. 419,568 filed Nov. 28, 1973, and assigned to the assignee of this application, there are described further electrochemical cells having thionyl chloride, sulfuryl chloride, and mixtures thereof as the solvent material.

In application Ser. No. 492,316 filed July 26, 1974, and application Ser. No. 517,557, filed Oct. 24, 1974, both assigned to the assignee of this application, there is disclosed, respectively, the use of carbon and $(C_4F)_n$ active cathode materials as surfaces upon which the solvent material is catalytically reduced, thereby yielding cells utilizing the otherwise "dead" weight of the solvent material as an energy source.

In application Ser. No. 325,467, filed on Jan. 22, 1973, now U.S. Pat. No. 3,922,174, and assigned to the assignee of this application, cells having the same anode, cathode and electrolytic solution as set forth in the aforementioned applications and housed in a titanum or titanium alloy container are described.

SUMMARY OF THE INVENTION

This invention is directed to an electrochemical cell having an alkali metal anode; an electronically conducting cathode and a nonaqueous electrolytic solution having an inorganic solvent material such as phosphorus oxychloride, thionyl chloride, sulfuryl chloride, or mixtures thereof. The cell is housed in a container the inner surface of which is an oxide of either titanium, aluminum, magnesium or alloys thereof. Such a container has been found not only to be lightweight, but to have a high degree of compatibility with the inorganic solvents described above.

The anode is an active material and is preferably lithium metal. Another material for anodes contemplated for use in this invention is sodium. The anode may be constructed of the active anode material in contact with a metal grid. Preferably, the grid for the active anode material is made of nickel or a nickel alloy.

The material for the electronically conducting cathode may be, for example, carbon or $(C_4F)_n$. $(C_4F)_n$ is a carbon-fluorine intercalation compound where n refers to the presence of a large, but indefinite, number of recurring $(C_4F)$ groups in the intercalation compound, such as shown, for example, in U.S. Pat. No. 3,514,337. It is commercially available under the designation fluorographite-B from Ozark-Mahoning Co.

The $(C_4F)_n$ active cathode material can be utilized in combination with graphite, carbon black, or $(CF)_n$. When admixed with $(CF)_n$ the active cathode material will have an average or representative formula $(C_xF)_n$, where $x$ is greater than 1 and less than 4. Such an intercalation compound is considered to be a mixture of $(C_4F)_n$ and $(CF)_n$ in a proportion which gives the particular value of $x$.

The carbon cathode can be in any of its conventional electrode acceptable forms, for example, graphite, carbon black or acetylene black, etc. Graphite and carbon black are, however, presently preferred.

If desired, the active cathode material may be blended with a binder material, such as polyethylene, polyproplene, polytetrafluoroethylene, etc.

The electronically conducting cathode material, with or without binder, may be either unsupported or supported by a current collector which is inert to the particular solvent materials utilized in the cells of this invention. By "inert" it is meant that there is no physical, chemical or electrochemical interaction with the solvent material. Suitable current collectors include nickel and nickel alloys. Optionally, the active cathode material may instead be blended with a finely divided conductive material, if necessary, to make the mixture sufficiently conductive.

As used throughout this specification and claims, when an electrochemical cell is designated to have a particular anode or cathode material, that anode or cathode, or anode or cathode material shall mean the electrochemically active component of the anode or cathode structure. The electrochemically active component may be in contact with or form a part of a suitable substrate which further defines the total anode or cathode structure.

The nonaqueous electrolytic solution includes an inorganic solvent material selected from the group consisting of phosphorus oxychloride, thionyl chloride, sulfuryl chloride, and mixtures thereof. It is preferred that the solvent be dried prior to use. In the case of phosphorus oxychloride, for example, this can be accomplished by boiling this solvent with clean lithium shot for twelve hours at room temperature under an argon atmosphere. The solvent is then distilled at atmospheric pressure and the material which boils between 105°C and 106°C is collected. Other suitable techniques, and drying techniques for the other solvents, are described in the published literature or will be apparent to those skilled in the art.

Solutes which can be dissolved in the solvent material provide at least one anion of the general formula, $MX_4^-$, $M'X_6^-$, and $M''Cl_6^{--}$, where M is an element selected from the group consisting of aluminum and boron; M' is an element selected from the group consisting of phosphorus, arsenic, and antimony; M'' is an element selected from the group consisting of tin, zirconium, and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are hexafluorophosphates ($PF_6^-$). Examples of solutes yeilding anions $M''Cl_6^{--}$ are: hexachlorostannates ($SnCl_6^{--}$) hexachlorozirconates($ZrCl_6^{--}$) and hexachlorotitanates($TiCl_6^{--}$). However, solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), bound adducts of dichlorophosphates and Lewis acids (such as $ZrCl_4$, $AlCl_3$, $BCl_3$, etc.), and chlorosulfates ($SO_3Cl^-$) are also contemplated within the scope of this invention.

The solute also provides at least one cation. This cation may be an alkali metal, usually lithium or sodium. Another cation contemplated within the scope of this invention is phosphorus oxydichloride ($POCl_2^+$). The solute for a particular cell can be chosen to yield a combination of any of the anions and cations listed above, however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present. Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate. Other preferred compounds are Lewis acids; particularly aluminum chloride ($AlCl_3$), tin chloride ($SnCl_4$), antimony fluoride ($SbF_5$), titanium chloride ($TiCl_4$), aluminum bromide ($AlBr_3$), phosphorus fluoride ($PF_5$), and zirconium chloride ($ZrCl_4$). In addition, Lewis bases having the general formula AB where A is an element selected from the group consisting of lithium, sodium, potassium, rubidium and cesium, and B is an element selected from chlorine, bromine, iodine and oxygen are also useful.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as a result of the reaction of a Lewis acid with a Lewis base dissolved in the solvent.

Although not required for the cell of this invention, a suitable separator can be employed to prevent the reaction of anode and cathode materials when no electric current flows through the external circuit. A separator prevents the diffusion of cathode material to the anode. Since the cathode material is not soluble in the electrolyte, mechanical separators can be used. A wide variety of ceramic and plastic materials having small pore sizes are available. Examples of such materials include: alumina, beryllia, magnesia, zirconia, titania, porcelain, porous glass, fritted glass, nonwoven porous polytetrafluoroethylene and other fluorinated polymers.

The active elements of the cells of the present invention are housed in a container in which the inner surface, that is, the surface in contact with the electrolytic solution is an oxide of either titanium, aluminum, magnesium or alloys thereof so as to be inert to the solvent materials listed above. The container may be fabricated from an oxide of one (or combination) of the metals listed above or alternatively, can be fabricated from any one (or combination) of the metals listed above and then coated on its inner surface, with an oxide coating of the particular metal (or metals). The oxide coating may be formed by any technique known in the art. For example, the coating may be formed by first anodizing the material and then sealing the material. The oxide coating should be pore-free, that is, have no voids and should preferably have a minimum thickness of at least about one micron for effective protection. It has been found that containers fabricated as set forth above have even a higher degree of compatability with the solvent materials listed above than the containers fabricated in the manner set forth in the above cited application Ser. No. 325,467.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

EXAMPLE I

A cell is prepared having the following configuration:

Anode: Lithium
Cathode: A blend of 63% carbon black and 37% polytetrafluoroethylene
Electrolyte: 1.8 M $LiAlCl_4$ in $SOCl_2$
Container: Aluminum having a pore free oxide coating one micron thick on its inner surface. The coating formed by first anodizing the aluminum and then sealing the resulting coating.

EXAMPLE II

A cell is prepared having the following configuration:

Anode: Lithium
Cathode: A blend of 63% carbon black and 37% polytetrafluoroethylene
Electrolyte: 1.0 M $LiAlCl_4$ in $SO_2Cl_2$
Container: Aluminum oxide

EXAMPLE III

A cell is prepared having the following configuration:

Anode: Lithium
Cathode: Pyrolytic graphite
Electrolyte: Saturated solution of $LiBF_4$ in $POCl_3$
Container: Aluminum having a pore free aluminum oxide coating on its inner surface

EXAMPLE IV

A cell is prepared having the following configuration:

Anode: Lithium
Cathode: $(C_4F)_n$ blended with a polytetrafluoroethylene emulsion
Electrolyte: 1.8 M $LiAlCl_4$ in $SOCl_2$
Container: Magnesium having a pore free oxide coating on its inner surface

EXAMPLE V

A cell is prepared having the following configuration:

Anode: Lithium
Cathode: $(C_4F)_n$ blended with polytetrafluoroethylene as a binder
Electrolyte: 1.0 M $LiBCl_4$ in $POCl_3$
Container: Magnesium having a pore free magnesium oxide coating on its inner surface

EXAMPLE VI

A cell is prepared having the following configuration:

Anode: Lithium
Cathode: $(C_4F)_n$ blended with polytetrafluoroethylene as a binder
Electrolyte: 1.0 M $LiAlCl_4$ in a (1:1) mixture of $SOCl_2$ and $SO_2Cl_2$
Container: Titanium having a pore free titanium oxide coating on its inner surface

EXAMPLE VII

A cell is prepared having the following configuration:
Anode: Lithium
Cathode: A blend of carbon black and polytetrafluoroethylene as a binder
Electrolyte: 1.0 M $LiAlCl_4$ in $SOCl_2$
Container: Aluminum having a pore free aluminum oxide coating on its inner surface While the present invention has been described with reference to specific embodiments thereof, it will be understood by those skilled in this art that various changes may be made without departing from the true spirit and scope of the invention. In addition, many modifications may be made to adapt the particular situation, material, need, apparatus, process, or then-present objectives, to the spirit of the present invention without departing from its essential teachings.

What is claimed is:

1. An electrochemical cell comprising an alkali metal anode; an electronically conducting cathode material, a nonaqueous electrolytic solution comprising an inorganic solvent selected from the group consisting of phosphorus oxychloride, thionyl chloride, sulfuryl chloride, and mixtures thereof, and a solute dissolved in said solvent; said anode, cathode and electrolyte being housed in a container the inner surface of which is an oxide of a material selected from the group consisting of aluminum, magnesium, and titanium and alloys thereof.

2. The electrochemical cell of claim 1 wherein said container is fabricated from a material selected from the group consisting of aluminum oxide, titanium oxide, magnesium oxide and alloys thereof.

3. The electrochemical cell of claim 1 wherein said container is fabricated from a material selected from the group consisting of aluminum, magnesium, titanium and alloys thereof and wherein the oxide on the inner surface is in the form of a coating.

4. The electrochemical cell of claim 1 wherein said container is fabricated from aluminum and is coated on its inner surface with a pore free coating of aluminum oxide.

5. The electrochemical cell of claim 1 wherein said container is fabricated from a titanium alloy and coated on its inner surface with a pore free coating of titanium oxide.

6. The electrochemical cell of claim 1 wherein said active anode material is lithium.

7. The electrochemical cell of claim 1 wherein said active anode material is sodium.

8. The electrochemical cell of claim 1 wherein said cathode material is carbon black.

9. The electrochemical cell of claim 1 wherein said cathode material is graphite.

10. The electrochemical cell of claim 1 wherein said cathode material is $(C_4F)_n$ where n refers to an indefinite number of $(C_4F)$ units in said cathode material.

11. The electrochemical cell of claim 1 wherein said solute provides at least one anion having the formula $X^-$, $MX_4^-$, $M'X_6^-$, and $M''Cl_6^{--}$, where M is an element selected from the group consisting of aluminum and boron; M' is an element selected from the group consisting of phosphorus, arsenic and anitomony; M'' is an element selected from the group consisting of tin, zirconium and titanium; and X is a halogen; said solute further providing at least one alkali metal cation.

12. The electrochemical cell of claim 1 wherein said solute includes at least one compound selected from the group consisting of lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate and lithium chlorosulfate.

13. The electrochemical cell of claim 1 wherein said solute includes a Lewis acid and a Lewis base.

14. The electrochemical cell of claim 1 wherein said inorganic solvent is phosphorus oxychloride.

15. The electrochemical cell of claim 1 wherein said inorganic solvent is thionyl chloride.

16. The electrochemical cell of claim 1 wherein said inorganic solvent is sulfuryl chloride.

17. The electrochemical cell of claim 1 wherein said inorganic solvent is a mixture of at least two of said inorganic solvent materials.

* * * * *